Oct. 24, 1950      E. A. PUERNER      2,527,331

HYDRAULIC CONTROL MECHANISM

Filed Oct. 8, 1947      3 Sheets-Sheet 1

INVENTOR.
Erving A. Puerner,
BY Morsell & Morsell
ATTORNEYS.

Oct. 24, 1950 E. A. PUERNER 2,527,331
HYDRAULIC CONTROL MECHANISM
Filed Oct. 8, 1947 3 Sheets-Sheet 2

INVENTOR.
Erving A. Puerner,
BY
Morsell & Morsell
ATTORNEYS.

Oct. 24, 1950  E. A. PUERNER  2,527,331
HYDRAULIC CONTROL MECHANISM
Filed Oct. 8, 1947  3 Sheets-Sheet 3

INVENTOR.
Erving A. Puerner,
BY Morsell & Morsell
ATTORNEYS.

Patented Oct. 24, 1950

2,527,331

UNITED STATES PATENT OFFICE 2,527,331

HYDRAULIC CONTROL MECHANISM

Erving A. Puerner, Milwaukee, Wis., assignor to Shallcross Controls, Inc., Milwaukee, Wis., a corporation of Wisconsin Application October 8, 1947, Serial No. 778,685

5 Claims. (Cl. 60—52)

This invention relates to improvements in hydraulic control mechanisms, and more particularly to a pilot valve therefor.

The control of the flow or pressure of fluids, both liquid and gaseous, is an essential factor in the proper operation of many industrial plants, such as for example, those engaged in the manufacture of glass, metals, chemicals and so forth. At the present time electrically operated control mechanisms are commonly used for such purposes. These electrically operated mechanisms are complicated and consequently are expensive to manufacture and repair.

It is, therefore, a general object of the present invention to provide a control mechanism of the class described which is simple in design, easy to manufacture, and which has a minimum of working parts which can get out of order.

A further object of the invention is to provide a control mechanism which is hydraulically operated and which does not employ complicated gear reduction units.

A further object of the invention is to provide an hydraulic control mechanism employing a very sensitive pilot valve therein which regulates the movement of an hydraulic ram connected to a valve or damper for controlling the flow of fluid through a conduit.

In conventional valves the valve stem thereof is subject to considerable starting friction and as a result it requires the application of a much greater amount of force to initiate movement of the valve stem than is required to keep the stem in motion once it has been started with the result that it has not heretofore been possible to produce a valve for the type of service under consideration which would operate smoothly under the application of a minimum of force thereto, both initially and after movement of the valve stem had commenced.

With the above in mind it is, therefore, an object of the invention to provide a valve wherein the valve stem is moved longitudinally within a rotating sleeve which maintains constant relative movement between it and the stem, even when the latter is at rest, thereby negativing the inertia of the valve stem and producing a smooth and sensitive valve in which it is never necessary to apply undue initial force to break the stem loose of its enclosing sleeve.

A more specific object of the invention is to provide very high sensitivity in a valve by reducing the initial starting function of the stem thereof to a negligible amount, thereby making the stem very accurately responsive to slight axial forces applied to it.

A further object of the invention is to provide an hydraulic control mechanism, including a pilot valve associated with a fluid pressure responsive means, which is particularly adapted for regulating the rate of flow of a fluid through a conduit to thereby maintain a desired condition of flow or pressure at a selected point in said conduit, regardless of fluctuations in the rate of introduction of fluid into said conduit.

With the above and other objects in view, the invention consists of the improved hydraulic control mechanism and all its parts and combinations, as set forth in the claims and all equivalents thereof.

In the accompanying drawings in which the same reference numerals designate the same parts in all of the views.

Figure 5:
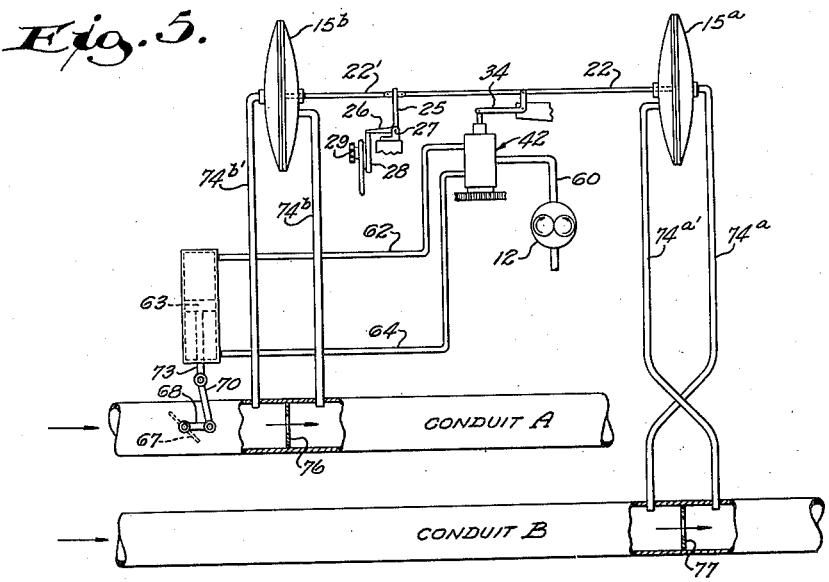
Figure 6:
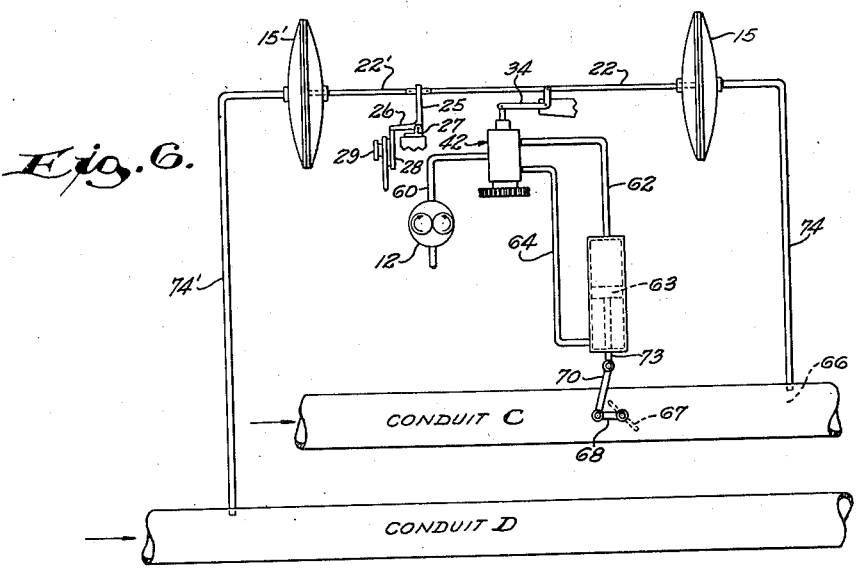

Fig. 5 is a diagrammatic view of the control mechanism adapted to control the flow of fluid in one conduit and to maintain said flow in a selected ratio to the flow in a second conduit; and Fig. 6 is a diagrammatic view of the control mechanism adapted to control the pressure of fluid flowing in one conduit and to maintain said pressure in a selected ratio to the pressure of fluid flowing in a second conduit.

Referring more particularly to Figs. 1 to 4 inclusive of the drawings wherein is shown an adaptation of the present invention for maintaining the pressure of a fluid flowing through a conduit at a selected level, the numeral 10 indicates a metallic, oil-tight container having, in the present exemplification, an open top and four vertically disposed sides which form substantially a square in horizontal cross-section. Mounted on the exterior of two opposite sides of the container 10 are an electric motor 11 and a gear pump 12. The shafts of both the motor 11 and the pump 12 extend into the interior of the container 10 and are joined by a shaft 13 by means of suitable couplings. Formed on the central portion of the shaft 13 is a worm gear 14. The inlet (not shown) to the pump 12 is located near the bottom of the container 10. Built within the pump 12 (and also not shown) is a conventional by-pass valve which, when pressure in excess of a predetermined amount is built up at the discharge of the pump, the fluid at the discharge side of the pump is caused to be by-passed back to the inlet side of the pump. This prevents the building up of dangerous pressures which would otherwise be built up by the gear pump 12.

Mounted on the exterior of a third side of the container 10 is a diaphragm assembly 15 which consists of a circular diaphragm 16 of suitable flexible material securely peripherally mounted in air tight engagement between two members 17 and 18 of the diaphragm housing. The side of the diaphragm 16 adjacent the member 17 is open to atmospheric pressure through the aperture 19 which extends through the member 17 and the adjacent side of the container 10. The side of the diaphragm 16 adjacent the member 18 is subject to the pressure exerted on it by fluids acting thereagainst through the aperture 20.

Disposed on either side of the diaphragm 16 and concentric therewith are metallic discs 21 having a substantially smaller diameter than the diaphragm 16 and having outwardly turned peripheral edges. An actuating rod 22 having a threaded end extends through the centers of the discs 21 and the diaphragm 16. Suitable nuts 23 and washers 24 hold the discs 21 and the diaphragm 16 in close engagement and in addition furnish a connection between the discs 21 and the threaded end of the rod 22.

Pivotally connected to the opposite end of the rod 22 is the upper end of a vertically extending leaf spring 25. Connected to the base of the spring 25 is a right angularly extending portion 26, the spring 25 and extension 26 being pivotally mounted, as at 27, for movement in a vertical plane in the manner of a bell crank lever.

Rotatably mounted adjacent the interior of a side of the container 10 and opposite the side thereof on which the diaphragm assembly 15 is mounted, is a cam plate 28. The cam plate 28 is connected, by means of a suitable shaft extending through the side of container 10, to a manually operable knob 29 having a pointer 30 which indicates the position of said cam plate with respect to a dial 31. The edge surface of the cam plate 28 is in sliding contact with the end portion of the spring extension 26, the extension 26 being urged upwardly into said contact by a spring 32. Pivotally mounted on a suitable bracket 33, as at 38, for movement in a vertical plane, is a bell crank lever 34 having a vertically extending arm and a horizontally extending arm. The vertically extending arm of the lever 34 is pivotally connected to a link 35, as at 36, and the link 35 is pivotally connected to the rod 22 as at 37. The end of the horizontally extending arm of the lever 34 is pivotally connected to a downwardly extending link 39, as at 40, and the lower end of the link 39 is pivotally connected, as at 43, to the upper end of the stem 41 of a pilot valve, generally indicated by the numeral 42.

The pilot valve 42 consists of a substantially cylindrical body 45 which is axially vertically supported by a suitable bracket 44 which is secured to a side of the interior of the container 10. The body 45 is axially bored, as at 46, to slidably receive a rotatable sleeve 47. The sleeve 47 is prevented from sliding downwardly in the bore 46 by a retaining collar 48 which is rotatable therewith and is connected thereto by any suitable means such as a set screw 49. A portion of the sleeve 47 extends below the body 45, and on this portion there is connected, by any suitable means such as a key 50, a helical gear or worm wheel 51. The gear 51 meshes with the worm 14 on the shaft 13. The sleeve 47 is formed with four spaced exterior circumferential grooves 52, 53, 54 and 55 (see Figs. 3 and 4). Connecting each of the respective above-mentioned circumferential grooves with the bore of the sleeve 47 are spaced radial apertures 52', 53', 54' and 55'. Extending radially through the body 45 and registering with the respective circumferential annular grooves in sleeve 47 are apertures 52'', 53'', 54'' and 55''.

The valve stem 41 is similar to that used in a conventional balanced valve. It is cylindrical in shape and is axially and rotatably slidable in the sleeve 47. Adjacent its lower end the stem 41 is formed with a relatively wide external circumferential recess 56, and spaced above the recess 56 on the stem 41 is a similar, but narrower, recess 57. The recesses 55 and 56 result in the formation, on the end of stem 41, of a collar 58, and, spaced upwardly therefrom a distance equal to the distance between the apertures 55' and 53', a collar 59. It will be noted that when the stem 41 is in the neutral position shown in Fig. 3, the collar 58 registers with and effectively covers the aperture 55', and the collar 59 registers with and effectively covers the aperture 53'.

The aperture 54'' of the body 45 is tapped to threadedly receive a tube 60 which threadedly connects, at its other end, with the discharge 61 of the gear pump 12. The aperture 53'' is tapped to threadedly receive a tube 62 which is threadedly connected at its other end to the inner end of the cylinder of a double acting hydraulic ram 63. The aperture 55'' is tapped to threadedly receive a tube 64 which is threadedly connected at its other end to the outer end of the cylinder of ram 63.

Figure 1:
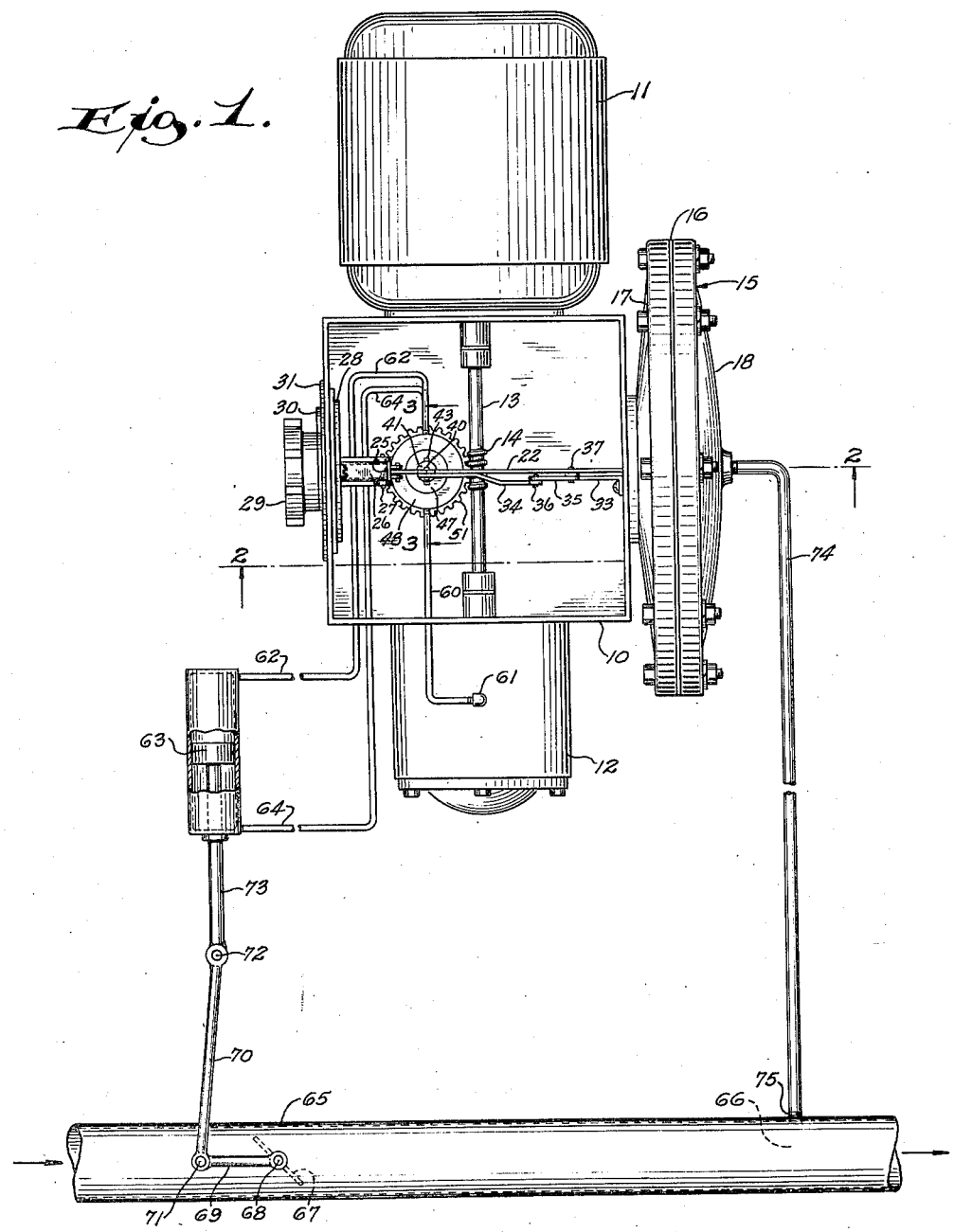
Fig. 1 is a plan view of the improved control mechanism.

The numeral 65 indicates the conduit in which the fluid, the pressure of which is to be regulated, flows in the direction indicated by the arrows in Fig. 1. The pressure at any desired point, such as the point indicated by the numeral 66, is regulated by the adjustment of a damper 67 which is positioned within the conduit 65, and is pivotally mounted on a rotatable shaft 68. Rigidly connected to an end of shaft 68 which extends exteriorly of the conduit 65 is an arm 69. A link 70 is pivotally connected to the arm 69, as at 71, and pivotally connected as at 72 to the end of the piston rod 73 of the hydraulic ram 63. The aperture 20 in the diaphragm assembly 15 (see Fig. 2) is tapped to threadedly receive a tube 74 which at its other end is threadedly connected to the conduit 65 in the vicinity of point 66, as at 75. The container 10 is filled with oil substantially to the level indicated in Fig. 2 to form an oil bath or sump 75.

Operation

As the motor 11 is started, the shaft 13 is caused to rotate, which in turn causes the gear pump to start pumping oil, taking it from the sump 75'. The worm 14 rotates with the shaft 13 and causes the cooperating gear 51, along with the sleeve 47, to rotate. The rotation of the sleeve 47 is a very important part of this invention. Because of the rotation of the sleeve 47 the stem 41 may be easily moved upwardly and downwardly within the sleeve 47 by the application of a very slight amount of axial force. The starting friction of a conventional valve stem requires the application of a much greater amount of force to initiate motion of the stem than is required to keep the stem in motion once it has been started. The result is that in conventional structures a smoothly operating valve is practically an impossibility. The present invention reduces the starting friction of the valve stem to a negligible amount by means of the constant rotation of the sleeve 47 which maintains constant relative motion between it and the stem 41 even though the stem 41 may be at rest. The result of this constant relative motion is that it is never necessary to break the stem 41 free of the sleeve 47 in order to move the stem 41 within the sleeve. Substantially all of the axial force applied to the stem 41 is effective to overcome the slight amount of inertia inherent in the stem 41 and to thereby easily move said stem. Since the inertia of the stem 41 is a relatively small factor, the stem 41 can be moved very readily by the application of very slight amounts of axially applied forces. As a result of this innovation a very smoothly operating valve is produced which is quickly responsive to slight axial forces and which is particularly well adapted for use in conjunction with sensitive control mechanisms.

Figure 3:
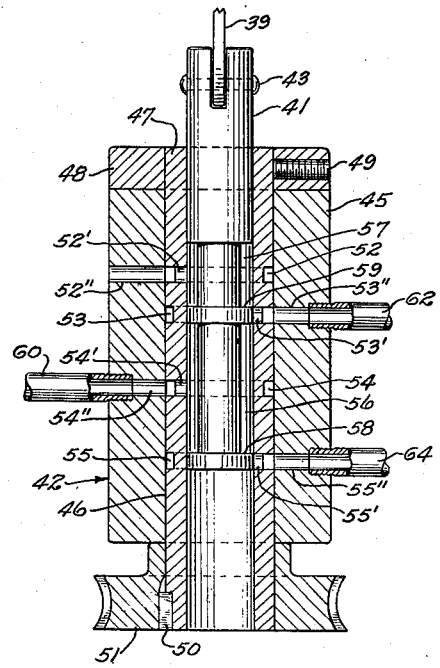
Fig. 3 is an enlarged fragmentary vertical sectional view of the pilot valve taken along the line 3—3 of Fig. 1 and showing the pilot valve stem in its neutral position.
Figure 4:
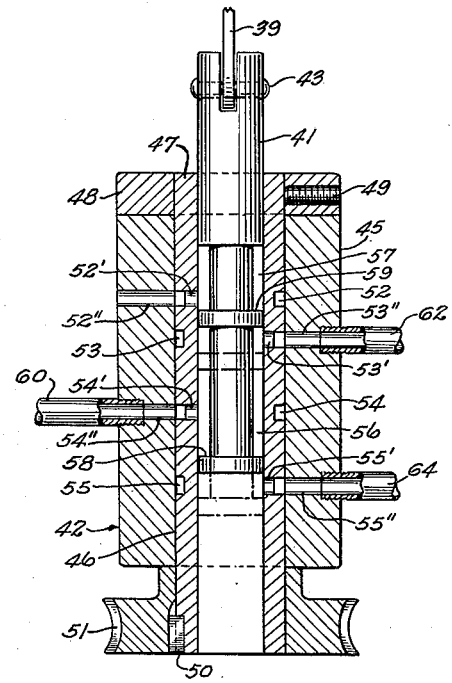
Fig. 4 is a sectional view similar to Fig. 3, but showing different full and broken line positions of the pilot valve stem for the delivery of oil to the hydraulic ram, the raised position thereof being shown in full lines, and the lowered position thereof being shown in broken lines.
Figure 2:
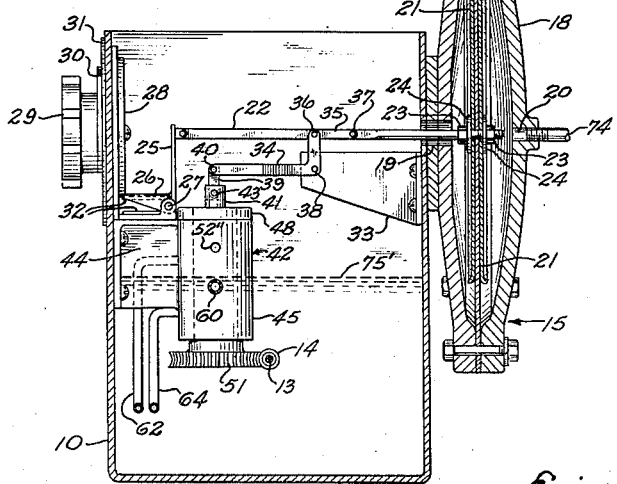
Fig. 2 is a vertical sectional view taken along the line 2—2 of Fig. 1, and showing the normal working oil level.

When the pressure in the conduit 65 at the point 66 is at the desired level indicated by the pointer 30 on the dial 31, the entire control mechanism will be in equilibrium as shown in Fig. 2, and the stem 41 of the pilot valve will be in its neutral position as shown in Fig. 3. When this condition of equilibrium obtains, the pressure, in pounds per square inch, at the point 66, acts against the right hand side (relative to Fig. 2) of the diaphragm 16 (through the tube 74) and is exactly equal to the forces acting in the opposite direction on the diaphragm 16. These opposite forces are those caused by atmospheric pressure plus the pressure of the spring 25 acting against the driving rod 22 (disregarding pressures caused by weight of the valve stem 4 of the linkage and so forth). When the stem 41 is in its neutral position (see Fig. 3), the collars 58 and 59 cover the ports 55' and 53' respectively, thereby preventing oil flow therethrough, as pumped by the gear pump through the tube 60, the aperture 54", the annular groove 54 and the aperture 54' into the recess 56 of the stem 41. When this situation obtains, the by-pass valve built into the pump 12 acts to relieve excessive pressures as previously explained, since the motor 11 and pump 12 are constantly running.

The pressure exerted on the diaphragm 16 by the rod 22 can be varied by means of rotating the cam 28. Depending upon which way the cam 28 is rotated (by means of the knob 29) the end portion of the extension 26, which is kept in contact with the edge of said cam by the spring 32, moves correspondingly upwardly or downwardly. As the extension 26 pivots on pin 27, the spring 25 is urged in the same direction, resulting in deformation of the spring 25 which causes either a pulling or a pushing force to be exerted on the rod 22 by the spring 25, depending upon in which direction the spring 25 is urged by the extension 26. A rotation of the cam 28 while the control mechanism is in a condition of equilibrium, results in a condition of unbalance. A condition of unbalance may also be brought about by a fluctuation in the amount of fluid flowing into the conduit 65. In actual practice, the position of the cam 28 is changed relatively infrequently and the control mechanism is used to maintain a constant pressure at the point 66 regardless of the variations in the amount of fluid delivered to the conduit 65.

Assuming that, with the mechanism in equilibrium, as shown in Figs. 2 and 3, the input to the conduit 65 should suddenly decrease. As a result of such decrease in input, the pressure at point 66 would decrease, as would the identical pressure acting against the right hand side (in Fig. 2) of the diaphragm 16. The unbalance of forces acting on the diaphragm would then cause it to deflect toward the right, pulling with it the actuating rod 22. The unbalance of forces acting on the diaphragm 16 could quickly be corrected by an adjustment of the cam 28 which would cause the spring 25 to exert less push on the rod 22, but this would do nothing toward the maintenance of a constant pressure at the point 66. Leaving the setting of the cam 28 at its original setting in such a case, would result in the following reaction by the control mechanism:

As the rod 22 moves toward the right the link 35 also moves toward the right, pulling with it the pivot 36 and the upper end of the vertical arm of the bell crank 34. The bell crank 34, as a result, pivots on pin 38 in a clockwise direction (relative to the drawing) and pulls upwardly on the link 39 and stem 41 of the valve 42. The valve 42 will then have its stem 41 in raised position, as shown in full lines in Fig. 4. When the stem 41 is in this position the oil pumped into the recess 56 by the pump 12 is permitted to flow through port 53', annular groove 53, aperture 53" and tube 62. The oil flow through the tube 62 is under pressure to the inner end of the cylinder of the hydraulic ram 63. This introduction of oil into the cylinder under pressure causes the ram to move outwardly (down in Fig. 1). The oil which is on the outer side of the ram 63 is forced out of the cylinder, as the ram moves outwardly, through the tube 64, the aperture 55" (see Fig. 4), the annular groove 55, the aperture 55' and the lower end of the interior of sleeve 41, into the oil bath or sump 75'. The piston rod 73 and the link 70 are moved in the same direction as the ram 63 and thereby cause the arm 69, the shaft 68 and the damper 67 to rotate in a counterclockwise direction (relative to the drawings). This rotation of the damper moves it to a position wherein it exerts less resistance to flow of fluid through the conduit 65 and consequently permits more fluid to pass therethrough. More fluid passing through the conduit 65 causes a higher pressure at point 66, which pressure is communicated to the diaphragm 16 by tube 74. As the ram gradually moves outwardly the pressure at point 66 gradually increases thereby causing the diaphragm and the rod 22 to be slowly moved toward the left (in Fig. 2). This gradual movement of rod 22 causes simultaneous gradual downward movement of the stem 41 of the valve 42 and consequent simultaneous gradual closing off of the ports 55' and 53' by the collars 58 and 59 respectively. This, then, results in the gradual cessation of flow of oil to the ram 63 and it is gradually brought to rest at the position which corresponds to the position of the damper 67, said position being necessary to maintain the desired pressure at point 66.

Should the input of fluid to the conduit 65 increase, thereby raising the pressure at the point 66 above that desired, the excess of pressure will cause the diaphragm 16 to deflect to the left (see Fig. 2). This deflection causes the rod 22 to move toward the left (relative to the drawings), actuating the bell crank 34 in a counterclockwise direction and moving the stem 41 of the valve 42 downwardly to a position corresponding to that shown in dot and dash lines in Fig. 4.

When the valve stem 41 is in said lowered position, the oil under pressure from the gear pump 12 flows from the recess 56 out of the aperture 55', through the annular groove 55, the tube 55'' and into the tube 64. The tube 64 conducts the oil under pressure to the outer end of the cylinder of the ram 63. This causes the ram to move inwardly, forcing the oil on the inner side of the ram out through the tube 62 which leads to the aperture 53'', the annular groove 53, the aperture 53' and the recess 57 of the valve 42. This oil escapes from the recess 57 through the aperture 52', the annular groove 52 and the aperture 52'', spouting from the latter into the oil bath or sump 75'.

As the ram 63 gradually moves upwardly, the damper 67 is gradually moved in a clockwise direction, thereby offering gradually increased resistance to the flow of fluid through the conduit 65 and thereby gradually lowering the pressure at the point 66. The gradual lowering of pressure at point 66 permits the diaphragm 16 to gradually return to its normal unflexed or balanced condition. As the diaphragm 16 moves toward the right (see Fig. 2) toward its unflexed condition, the rod 22 also moves toward the right, causing the bell crank 34 to rotate clockwise and return the stem 41 to its central position (shown in Fig. 3), wherein the flow of oil to the ram 63 is shut off and the ram 63 is caused to come to rest. The position of the ram when at rest corresponds to the position of the damper 67 which offers sufficient resistance to flow of fluid in conduit 65 to maintain the pressure at point 66 at the desired level. The system is again in equilibrium, as shown in Fig. 2.

There are several other adaptations wherein the mechanism of the present invention can be used and which require only slight modifications. One of the most useful of such adaptations is that shown diagrammatically in Fig. 5. Said view illustrates diagrammatically a control for maintaining the rate of flow of a fluid in a conduit A in a selected ratio to the rate of flow of a fluid in a conduit B. The principle of operation of the control in this adaptation is similar to that of the mechanism shown in Figs. 1 to 4 and the same parts bear the same numbers as in those figures. A pair of diaphragm assemblies 15a and 15b are employed instead of the single diaphragm assembly 15 shown in Figs. 1 and 2. The diaphragm of the assembly 15b is linked to the spring 25 by means of rod 22', as is the rod 22. The opposite end of the rod 22 is connected to the diaphragm of assembly 15a.

The rate of flow of fluid through a conduit can be measured by placing a disc therein having an orifice of known area through which all of the fluid flows. The differential between the pressure at a point upstream from the orifice and the pressure at a point downstream from the orifice is a function of the rate of flow through the orifice. An orifice 76 is formed in the conduit A downstream from the damper 67, and an orifice 77 is formed in the conduit B. A tube 74a leads from the outer cavity of the diaphragm assembly 15a to a point within the conduit B upstream from the orifice 77, and a tube 74a' leads from the inner diaphragm cavity of assembly 15a to a point within the conduit B downstream from the orifice 77 as shown in Fig. 5. A tube 74b leads from the inner diaphragm cavity of the assembly 15b to a point within the conduit A downstream from the orifice 76 and a tube 74b' leads from the outer diaphragm cavity of assembly 15b to a point within the conduit A upstream from the orifice 26. It will be noted that the inner diaphragm cavities of both assemblies 15a and 15b are not open to atmospheric pressure as was the case with diaphragm assembly 15 shown in Fig. 2. The upstream side of an orifice is always the high pressure side, and it will be noted that with the described arrangement the resultant deflecting force on each of the diaphragms, due to the differential of pressures within the conduits, acts in an inward direction so that the deflections of the diaphragms of assemblies 15a and 15b act against one another through the rods 22 and 22'. If no spring 25 were used, the mechanism would tend to maintain the flow in the two conduits at the same level. By loading the rods 22 and 22' with the selectively variable tension of the spring 25, the mechanism will maintain rate of flow of the fluid in conduit A at a selectively variable ratio to the rate of flow of the fluid in conduit B.

When the rate of flow of the fluid in conduit A drops relative to that of the fluid in conduit B, the rods 22 and 22' are moved to the left by the diaphragms, and the spring 25 which movement, as described previously, actuates the valve 42 by moving the stem 41 downwardly. This, in turn, causes the ram 63 to move inwardly and to rotate the damper 67 in a counterclockwise direction (relative to the drawing). Said movement of the damper 67 permits more fluid to flow through the conduit A. The damper 67 is automatically moved to a position in which it permits the rate of flow in the conduit A necessary to maintain the desired ratio between the rates of flow of the fluids in the conduits A and B.

When the rate of flow of fluid through the conduit A increases relative to that in conduit B, the rods 22 and 22' are moved by the diaphragm and spring 25 to the right. This causes the valve stem 41 to be raised and results in the ram 63 being caused to move downwardly to rotate the damper 67 in a clockwise direction. The damper 67 is rotated to a position wherein it decreases the rate of flow of fluid through the conduit A to the amount necessary to maintain the desired ratio of rates of flow in the two conduits.

Another adaptation of the improved mechanism is its use as a pressure proportioning control as illustrated diagrammatically in Fig. 6. This arrangement maintains the pressure of a fluid flowing in a conduit C in a selected ratio to the pressure of a fluid flowing in a conduit D. All parts of the mechanism of Fig. 6 serve the same purpose as the corresponding parts in Figs. 1 and 2 with the addition of a diaphragm assembly 15' identical with assembly 15 of Fig. 2. The diaphragm of assembly 15' is linked, by means of a rod 22', to the spring 25 as shown, and a tube 74' leads from the outer diaphragm cavity of assembly 15' to a point within conduit D. The conduit C of Fig. 6 is identical with conduit 65 of Fig. 1, other corresponding parts of the remainder of the mechanism being indicated by the same numbers as are used in Figs. 1 and 2.

As was the case in the mechanism shown in Fig. 5, if no spring 25 were used in the mechanism of Fig. 6, the latter mechanism would tend to maintain the pressure in conduit C at the same level as the pressure in conduit D. By loading the rods 22 and 22' with the selectively variable tension of the spring 25, the mechanism of Fig. 5 will maintain the pressure in conduit C at a selectively variable ratio to the pressure in conduit D.

An excess of pressure at the point 66 in conduit C relative to that within the conduit D will cause the rods 22 and 22' to be moved to the left, which movement, by operation previously described, results in the damper 67 being moved in a clockwise direction to a position wherein it restrict the flow of fluid in conduit C and reduces the pressure at the point 66 to the level necessary to maintain the desired ratio of pressures in the conduits C and D. A decrease in pressure at point 66 in conduit C below that necessary to maintain the desired ratio, causes the rods 22 and 22' to be moved to the right relative to Fig. 6. This rod movement results in the damper being opened (moved in a counterclockwise direction) to permit more air to flow and to raise the pressure at point 66 to the amount necessary to maintain the desired ratio of pressures in the two conduits.

In addition to its use in the control mechanisms described, there are many mechanisms wherein the pilot valve 42 can be employed in conjunction with hydraulic relay valves. In such applications, the relay valve is the operating valve and is usually of much larger capacity than the pilot valve. The relay valve performs the desired work, but is actuated by the pilot valve which controls its movements. These applications are obviously all within the concept of the present invention.

There are various adaptations and modifications, other than those shown, which may be made without departing from the spirit of the invention, and all of such changes are contemplated as may come within the scope of the appended claims.

What is claimed as the invention is:

1. In an hydraulic control mechanism, a tank; an hydraulic ram; a pilot valve mounted in said tank and connected to and controlling said hydraulic ram, said pilot valve having a ported body formed with a bore, a ported sleeve which is open at both ends and which is rotatably mounted in said bore, and a stem axially reciprocatably mounted within the bore of said sleeve; an electric motor; a shaft extending within said tank and driven by said motor; an oil pump driven by said driven shaft and having a discharge conduit communicating with said valve; gear means connecting said valve sleeve and said driven shaft to cause rotation of said sleeve by said shaft; a pressure responsive device adapted to be connected to a source of fluid pressure; a spring mounted opposite said pressure responsive device; a rod connecting said spring to said pressure responsive device; and linkage connecting said rod to said valve stem in a manner to cause axial movement of said stem in response to axial movement of said rod, whereby an increase in the pressure to which said pressure responsive device is subjected causes axial movement of said rod and stressing of said spring to thereby cause axial movement of the valve stem with resultant modification of the flow of oil from said oil pump through said valve and movement of said ram.

2. In an hydraulic control mechanism, a tank; an hydraulic ram; a pilot valve mounted in said tank and connected to and controlling said hydraulic ram, said pilot valve having a ported body formed with a bore, a ported sleeve which is open at both ends and which is mounted in said bore for rotational movement only, and a stem axially reciprocatably mounted within the bore of said sleeve; an electric motor; a shaft extending within said tank and driven by said motor; an oil pump driven by said driven shaft and having a discharge conduit communicating with said valve; gear means connecting said valve sleeve and said driven shaft to cause rotation of said sleeve by said shaft; a pressure responsive device adapted to be connected to a source of fluid pressure; a cantilever spring mounted opposite said pressure responsive device; a rod connecting said spring to said pressure responsive device; and linkage connecting said rod to said valve stem in a manner to cause axial movement of said stem in response to axial movement of said rod, whereby an increase in the pressure to which said pressure responsive device is subjected causes axial movement of said rod and stressing of said spring to thereby cause axial movement of the valve stem with resultant modification of the flow of oil from said oil pump through said valve and movement of said ram.

3. In an hydraulic control mechanism, a tank; an hydraulic ram; a pilot valve mounted in said tank and connected to and controlling said hydraulic ram, said pilot valve having a ported body formed with a bore, a ported sleeve which is open at both ends and which is rotatably mounted in said bore, a drive gear fixed to said sleeve, and a stem axially reciprocatably mounted within the bore of said sleeve; an electric motor; a shaft extending within said tank and driven by said motor; an oil pump driven by said driven shaft and having a discharge conduit communicating with said valve; a gear fixed to said driven shaft and cooperable with the valve sleeve drive gear to cause rotation of said sleeve by said shaft; a pressure responsive device adapted to be connected to a source of fluid pressure; a cantilever spring mounted opposite said pressure responsive device; an adjustable mounting for said spring, a rod connecting the free end of said spring to said pressure responsive device; and linkage connecting said rod to said valve stem in a manner to cause axial movement of said stem in response to axial movement of said rod, whereby an increase in the pressure to which said pressure responsive device is subjected causes axial movement of said rod and stressing of said spring to thereby cause axial movement of the valve stem with resultant modification of the flow of oil from said oil pump through said valve and movement of said ram.

4. In an hydraulic control mechanism, a tank; an hydraulic ram; a pilot valve mounted in said tank and connected to and controlling said hydraulic ram, said pilot valve having a ported body formed with a bore, a ported sleeve which is open at both ends and which is rotatably mounted in said bore for rotational movement only, a drive gear fixed to said sleeve, and a stem axially reciprocatably mounted within the bore of said sleeve; an electric motor; a shaft extending within said tank and driven by said motor; an oil pump driven by said driven shaft and having a discharge conduit communicating with said valve; a gear fixed to said driven shaft and cooperable with the valve sleeve drive gear to cause rotation of said sleeve by said shaft; a pressure responsive device adapted to be connected to a source of fluid pressure; a cantilever spring mounted opposite said pressure responsive device; a pivotal mounting member to which one end of said spring is fixed; a manually operable adjustment member cooperable with said mounting member to vary the position of rotation of said mounting member and the portion of the spring fixed thereto; a rod connecting the free end of said spring to said pressure responsive device; and linkage connecting said rod to said valve stem in a manner to cause axial movement of said stem in response to axial movement of said rod, whereby an increase in the pressure to which said pressure responsive device is subjected causes axial movement of said rod and stressing of said spring to thereby cause axial movement of the valve stem with resultant modification of the flow of oil from said oil pump through said valve and movement of said ram.

5. In an hydraulic control mechanism, a tank; an hydraulic ram; a pilot valve mounted in said tank and connected to and controlling said hydraulic ram, said pilot valve having a ported body formed with a bore, a ported sleeve which is open at both ends and which is rotatably mounted in said bore, for rotational movement only, a drive gear fixed to said sleeve, and a stem axially reciprocatably mounted within the bore of said sleeve; an electric motor; a shaft extending within said tank and drivingly connected at one end to said motor; an oil pump drivingly connected to the other end of said driven shaft and having a discharge conduit communicating with said valve; a gear fixed to an intermediate portion of said driven shaft and cooperable with the valve sleeve drive gear to cause rotation of said sleeve by said shaft; a pressure responsive device adapted to be connected to a source of fluid pressure; a cantilever spring mounted opposite said pressure responsive device; a pivotal mounting member to which one end of said spring is fixed; a manually operable cam engageable with said mounting member to vary the position of rotation of said mounting member and the portion of the spring fixed thereto; spring means urging said mounting member against said cam; a rod connecting the free end of said spring to said pressure responsive device; and linkage connecting said rod to said valve stem in a manner to cause axial movement of said stem in response to axial movement of said rod, whereby an increase in the pressure to which said pressure responsive device is subjected causes axial movement of said rod and stressing of said cantilever spring to thereby cause axial movement of the valve stem with resultant modification of the flow of oil from said oil pump through said valve and movement of said ram.

ERVING A. PUERNER.

REFERENCES CITED

The following references are of record in the file of this patent:

UNITED STATES PATENTS

| Number | Name | Date |
|---|---|---|
| 853,785 | Henry | May 4, 1907 |
| 1,585,170 | Roučka | May 18, 1926 |
| 1,908,396 | Albright | May 9, 1933 |
| 2,082,940 | Brisbane | June 8, 1937 |
| 2,117,891 | Kalin | May 17, 1938 |
| 2,199,259 | Hersey | Apr. 30, 1940 |
| 2,258,094 | Keller | Oct. 7, 1941 |